United States Patent [19]

Check, Jr. et al.

[11] 4,386,272
[45] May 31, 1983

[54] APPARATUS AND METHOD FOR GENERATING IMAGES BY PRODUCING LIGHT SPOTS OF DIFFERENT SIZES

[75] Inventors: Frank T. Check, Jr., Orange; Ronald P. Sansone, Weston, both of Conn.

[73] Assignee: Pitney Bowes Inc., Stamford, Conn.

[21] Appl. No.: 391,029

[22] Filed: Jun. 22, 1982

Related U.S. Application Data

[60] Continuation of Ser. No. 240,532, Mar. 4, 1981, abandoned, which is a division of Ser. No. 130,278, Mar. 4, 1980, Pat. No. 4,310,757, which is a division of Ser. No. 922,596, Jul. 7, 1978, Pat. No. 4,218,157.

[51] Int. Cl.³ .............................................. H01J 3/14
[52] U.S. Cl. .................................. 250/236; 346/108; 358/298
[58] Field of Search .............. 250/236, 201, 234, 235; 358/298, 300, 302; 346/108, 109; 101/93.04

[56] References Cited

U.S. PATENT DOCUMENTS 4,214,157 7/1980 Check et al. ...................... 250/236

OTHER PUBLICATIONS

"Technology of Asynchronous Ink Jet Printing" by Koebiltz, Soc. Phat. Sci. & Eng., 1974, pp. 179-181.

Primary Examiner—David C. Nelms
Attorney, Agent, or Firm—Peter Vrahotes; Melvin J. Scolnick; Albert W. Scribner

[57] ABSTRACT

An electro-optical light scanning system using a modulated laser illumination source directed upon a multifaceted rotating polygonal mirror or polygon. The mirrored facets reflect the impinging light toward a moving photoreceptor and forms a raster of scan lines as the photoreceptor moves. The system incorporates sensing optics and closed loop electronics for correcting inaccuracies in the position of the reflected light resulting from defects in the angular relationship between the plane of the facets and that of the rotating axis of the polygon as well as those errors due to inherent angular misalignment between each of the facets of the rotating polygon. The invention also encompasses amplitude modulation for varying the intensity of the laser illumination in conjunction with the acousto-optical modulation for maintaining a constant level illumination and/or for varying the spot size.

7 Claims, 4 Drawing Figures

APPARATUS AND METHOD FOR GENERATING IMAGES BY PRODUCING LIGHT SPOTS OF DIFFERENT SIZES

This is a continuation, of application Ser. No. 240,532, filed Mar. 4, 1981 now abandoned, which is a division of the patent application having Ser. No. 130,278, filed Mar. 4, 1980, now U.S. Pat. No. 4,310,757, which is a division of an application having Ser. No. 922,596 filed July 7, 1978, now U.S. Pat. No. 4,218,157.

BACKGROUND OF THE INVENTION

1. Field of the Invention

The invention pertains to a laser spot scanning system for communicating information to a scanned medium and especially to a scanning system which utilizes reflected light from a multifaceted rotating polygon.

In particular, the invention is directed to a spot scanning system using acousto-optical and electro-optical means and methods to compensate for defects in facet to facet relationship and facet to axis error.

2. Description of the Prior Art

A recurring problem in scanner systems is to reduce or eliminate error introduced as a result of inherent defects in the construction of rotating polygonal mirrors. Such defects occur usually in the angular relationship between adjacent facets (facet-to-facet) and between facet planes and the polygonal rotational axis (facet-to-axis). A typical solution is to employ nonspherical optics to partially correct the effects of facet angular error as is shown in the apparatus described in the U.S. Pat. No. 4,002,830. Another situation is the use of optical reflecting or refracting elements pivotally mounted in the path of radiation utilizing electromechanical devices that are energized by timed electrical signals such that the refracting element is pivoted to correct the scanning errors caused by angular defects in the rotating mirror. The control of electromechanical devices is preprogrammed to make proper adjustments and the fabrication of these optical systems is thus expensive, as is alignment of the same.

In contrast to systems which use an encoder and logic to correct for error and operate in an open-loop manner by applying a predetermined correction factor, the instant system employs sensing optics and a feedback loop to correct the position of the raster scan lines.

SUMMARY OF THE INVENTION

The invention relates to an electro-optical light scanning system using modulated laser illumination and is particularly adaptable for nonimpact and fascimile printing. The light source, such as a laser beam, is acousto-optically modulated in accordance with selected input data. The laser beam so modulated is directed toward a multi-faceted polygon driven at a constant angular velocity. As the successive mirrored facets of the polygon are illuminated, the light reflected generates a plurality of scan lines formed by successive dots which move across a moving photoreceptor and which are modulated to thus generate characters or a recorded likeness of an original image.

In order to reduce scan line displacement errors and further to establish a geometric reference for synchronizing the writing logic with the position of the laser beam, this invention utilizes sensing optics and closed loop electronics for corrective compensation.

In particular, the facet-to-axis polygon error is detected by a spot position sensor, e.g., a split detector positioned within the scan format plane or optical equivalent and within the scan path. Before the reflected light traverses the photoreceptor, its longitudinal path axis is detected by a spot position sensor which includes a division parallel to the scan direction. A signal is generated which is then processed and used for applying corrective frequency modulation to the acousto-optical modulator to deflect the laser beam to the desired position prior to initiation of the scan line upon the photoreceptor.

The facet-to-facet polygon error is minimized by an optical edge start detector, such as a split photocell, positioned in the scan path and having a division perpendicular to the direction of the scan lines. The edge detector senses the passing of each scan line and establishes a geometric reference position for the beginning of each scan which is independent of any facet-to-facet error. The laser modulation for on-off gating and digital input from the buffer memories can thus be synchronized for writing on the photoreceptor.

An edge stop detector, similar to the start detector, is located at a terminal point beyond the photoreceptor. By measuring the time it takes for the scan spot to travel from the start to the stop edge detectors, the time of the flight of the scan spot is thusly determined. This information may be electronically interpreted and applied through a feedback loop to control the drive motor circuitry of the polygon and for maintaining constant velocity.

An advantage therefore of the present invention over the prior art systems for polygon encoding is that the individual facets of the polygon do not have to be characterized by preprogramming corrective adjustments. All accuracy is referrenced to the edge detector; therefore the frequency modulator is not required to have long term stability. Drift is removed from consideration as well as long term effects as long as they remain in the control range of the system.

BRIEF DESCRIPTION OF THE DRAWING

In an accompanying drawing in which is shown a preferred embodiment of the invention.

DESCRIPTION OF THE PREFERRED EMBODIMENT

Figure 1:
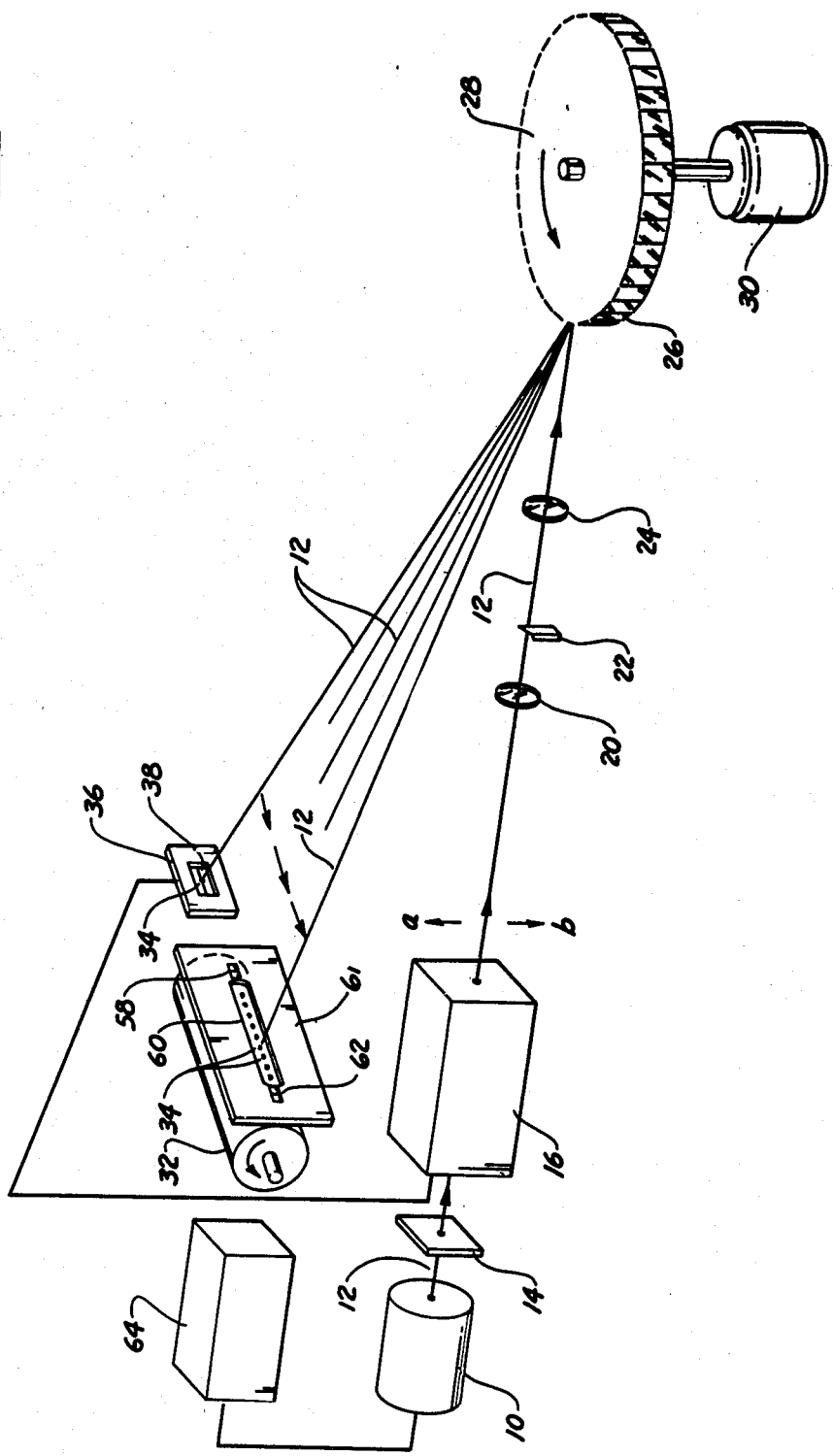
FIG. 1 is a diagramatic representation of the major components of an optical scanning device according to the present invention, the angle of reflection of the beam being distorted for purposes of illustration.

Referring now to the drawing, FIG. 1 illustrates an overall view of the scanning system of this invention. The light source, such as a laser 10, which may be a 3 mw holium-neon laser, generates a collimated beam 12 of monochromatic light which is directed through a neutral density filter 14 to control the light intensity. The beam 12 then passes through a modulator 16, such as an acousto-optical modulator. The beam 12 is next directed through a first lens 20 and intercepted by a knife edge 22 placed at the focal point of the first lens 20. The knife edge 22 is employed for stopping the zero order Bragg beam. The first order beam is thus separated and passes the knife edge 22 unattenuated. An example of a commercially available acousto-optic modulator is Model 1209 by Isomet Corp., Springfield, VA., which provides a built-in Bragg angle adjustment. The modulator 16 can typically be operated by a digital driver, such as Model no. 220 available from Isomet Corp. wherein transistor-transistor logic compatible digital input controls an RF switch for on-off gating of the modulator 16. Another acousto-optical modulator is Model 304 manufactured by Coherent Associates, Danbury, Conn.

It is desirable to use the first order beam to produce a spot because the position of the spot can be displaced in accordance with frequency modulation applied to the modulator which will selectively deflect the beam 12 in a desired direction such as indicated by the arrows a,b. The first order beam 12 is then directed toward a second lens 24 which directs a converging beam onto a reflecting face or facet 26 of a rotating polygonal mirror, herein referred to as a polygon 28. The polygon 28 is continuously driven by a motor drive 30 and preferably is maintained at a constant velocity. In the preferred embodiment as shown, the polygon 28 has thirty facets 26 and is designed for generating approximately 240 scan lines per second. A moderate spot velocity is preferred for implementing the optical spot sensing and closed loop feedback correction circuitry.

The beam 12 is thus reflected successively from each of the facets 26 of the rotating polygon 28 and onto a photoreceptor 32. The reflection of the beam 12 from the polygon 28 is distorted for purposes of illustration as it will be appreciated that the incident beam and reflecting beam will be in the same plane rather than at an angle to one another as indicated by FIG. 1. The modulated beam 12 may appear as a succession of dots 34 which will generate a scan line forming a raster across the moving photoreceptor 32. The photoreceptor 32 may be any image plane and can be mounted on a rotating drum such as for use with an electrophotographic copier.

It should thus be apparent that the light scanning system of the present invention can be readily interfaced with an electrophotographic copier having panchromatic photoreceptors and can thus function as a high quality nonimpact printer.

It is well known that various types of errors are inherent in the geometric fidelity of a commercially available rotating polygon. In particular, deviation in parallelism of each facet relative to the axis of rotation introduces a facet-to-axis error and the resulting scan lines will correspondingly contain these inaccuracies which manifest themselves as alignment deviations from a desired scan line travel axis, i.e., line to line spacing variation. The present invention provides a spot correction assembly 36 for optically detecting and correcting for these facet-to-axis errors. The spot correction assembly 36 in the preferred embodiment, is provided with an optical detector in the form of a split detector 38 optically positioned in the scan format plane and divided in half to form two cells A,B with a common electrode. A division C formed between the two cells A,B is registered with the desired scan path axis and has a dimension substantially less than the diameter of the spot 34. A signal will thus be generated from either or both cells A,B when the spot 34 sweeps the split detector 38. Since the alignment of division C is parallel to the scan direction, the division C provides a reference for indicating deviations of spot 34 from the desired travel axis on the photoreceptor 32.

Figure 2:
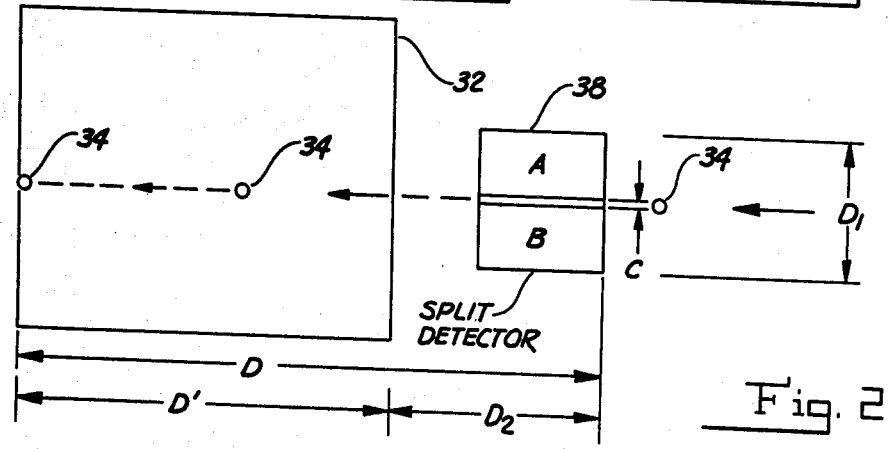
FIG. 2 is a schematic representation of the longitudinal travel of a modulated laser beam approaching and crossing a spot detector and photoreceptor.

Referring now to FIG. 2, maximum allowable uncorrected facet-to-axis angular error may cause the spot 34 to fall anywhere within a transverse zone D, within the light sensitive area of split detector 38. Successive scans as determined by the rotating polygon 28 are a distance D which is greater than the width D' of distance from the outside edge 33 of the photoreceptor 32 to the outside edge 39 of the split detector 38 by at least the greatest facet-to-facet deviation. It should thus be evident that the correction of each successive spot 34 is achieved during a "dead" time, i.e., the period of travel prior to traversing the photoreceptor 32.

Figure 3:
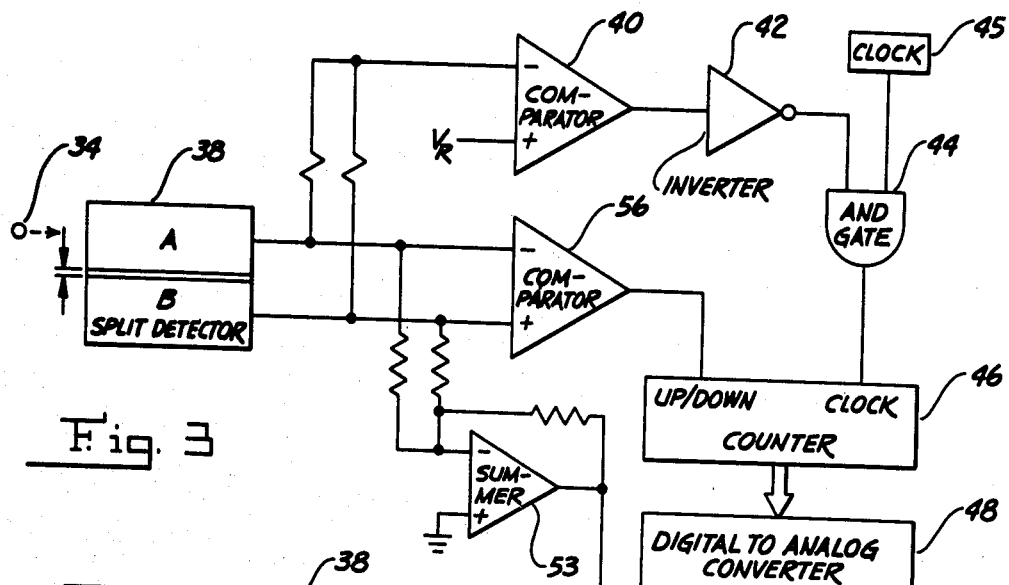
FIG. 3 is a schematic diagram of the spot correction logic.

A typical logic circuit implementing the present invention for control of an acousto-optical deflector to provide compensating deflection of the laser beam such that the spot 34 will exit the split detector 38 in registration with the division C between the individual cells A and B is shown in FIG. 3. When an uncorrected spot 34 of the laser beam enters the detector 38, a comparator 40 compares the signal generated at either photocell A or B with a reference voltage $V_r$ and provides a low output signal to an inverter 42 to generate a high enabling signal at an AND gate 44. A system clock 45 provides correction count pulses as a second input to the AND gate 44. The presence of the spot 34 at either cell segment A or B thus provides a high signal at the AND gate 44 enabling clock pulses to pass through the AND gate 44 and register at a counter 46. The instantaneous count of the counter 46 drives a digital to analog converter 48 which in turn provides an analog correction signal via a voltage controlled oscillator 50, an amplitude control 51, and an amplifier 52 to an acousto-optical deflector 54 which is incorporated into the modulator 16. The beam 12 will thus be displaced in the appropriate direction a or b. The amplitude control 51 is connected to a summer 53 that measures the amount of light falling on A and B of the split detector 38 to maintain the light output constant to the acousto-optical deflector 54.

It should be appreciated that the direction of count of the counter 46 determines the direction of corrective deflection applied by the deflector 54. In order to control the direction of count, a second comparator 56 compares the output of cell A with respect to the output of cell B. If the terminal spot 34 of the laser beam enters cell A, the output of cell A will be greater than that of cell B, and the comparator 56 will provide a low output. The low output of comparator 56 determines the count direction of the counter 46. As the deflecting correction is applied, the spot 34 progresses towards cell B while translating across the detector 38. As soon as the spot 34 crosses into cell B, the signal of cell B will be greater than the signal of cell A which causes the comparator 56 to switch to a high output. The high output of the comparator 56 reverses the direction of the counter 46 and thus provides an opposite direction of corrective deflection of the laser beam such that the laser beam will progress towards cell A. Thus, the spot 34 will track the division C until it exits from the detector 38 at which time the clock 45 is disabled and the correction value for the particular facet 26 is digitally stored in counter 46 until the next uncorrected spot enters the detector.

Figure 4:
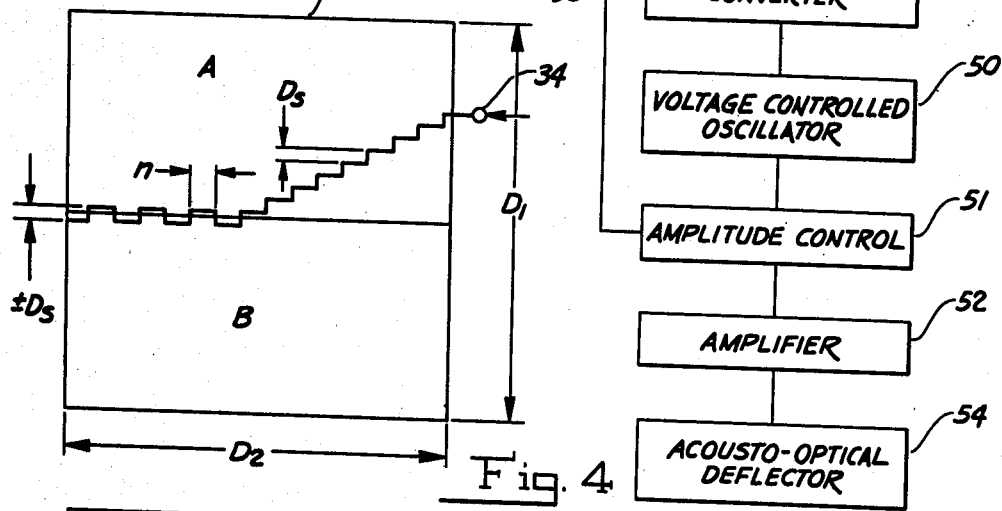
FIG. 4 is a diagramatic illustration of spot displacement during corrective modulation.

The control process is further detailed in FIG. 4. The spot 34 is shown entering the split detector 38 at cell A.

The displacement of the spot 34 resulting from an incremental change in the counter is reflected through the closed loop control circuitry through a deflection in either direction a or b. The uncertainty of the exit point of spot 34 is $\pm D_s$ due to the digitization of the signal. The amount $D_s$ is less than the tolerable error. With a given voltage controlled oscillator and acousto-optical modulator, $D_s$ can be varied by changing the scaling factor of the digital to analog converter. Since the most extreme error would be equivalent to (D1/2), the number of correction steps to bring the spot 34 to the division C is a maximum of $n=(D1/2D_s)$. Assuming it takes a given time $(t_s)$ to perform a corrective step, the total time is $(n)(t_s)=(D_1 t_s)/(2D_s)$. If the spot velocity is $V_s$, then the minimum length of photocell required is $D_2=[(D_1 t_s)/sD_s](V_s)$. A typical value for $V_s$ is 2200 inches per second.

Other alternate closed loop means of control include a successive approximation technique which converges more rapidly than the above described counter system.

A further method capable of converging more rapidly is the use of a precision sensing detector such as United Detector Technology PIN-SC/10D, which senses the centroid of a light spot and gives analog output proportional to spot position. These outputs can be digitized directly and coupled to a voltage controlled oscillator without intervening conversions.

Scan line spot detection will now be discussed with reference to FIG. 1. Since the modulator 16 is controllable by internal logic which determines exposure on the scan format 32, an edge detector 58 is positioned adjacent the leading edge of an exposure slot 60 formed in an opaque shield 61 for indicating when the spot 34 is at the precise location. The edge detector 58 and a logic circuit can thus be used as an implement to synchronize the internal logic with the location of the scan line. It should therefore be obvious that each sweep of the scan line is independently referenced and will thus negate any facet-to-facet polygon error which will manifest itself as jitter in the time successive scans cross a geometric reference point.

The edge detector 58 of the preferred embodiment utilizes a split photocell similar in construction to detector 38 except for orientation of the division perpendicular to the scan path. Each half of the split photocell forming detector 58 is essentially identical in area, location, material and temperature. Thus, the use of a split photocell has advantages over a single cell edge detector in that it will be relatively insensitive to laser light intensity change, temperature changes and ambient light.

A second edge detector 62 of similar construction to the edge detector 58 is located at a trailing edge of the exposure slot 60. The edge detector 62 will indicate when spot 34 has passed a fixed terminal point beyond the scan path. The time differential as detected between the first edge detector 58 and the second detector 62 can be interpreted through logic circuitry to indicate the flight time for spot 34 to cover a fixed length scan path. Thus, the speed of the spot can be computed. Variations in speed for different scan lines can be detected, and a feedback loop can then be utilized for speed control of the motor drive 30.

With regard to the aforementioned, it has been found that as a beam 12 is deflected or detuned from the Bragg angle, the efficiency will change. The scanning system of this invention, however, can be implemented by introducing an intensity modulator 64 for applying an amplitude modulated correction signal for maintaining laser illumination at a constant level. The intensity modulator 64 could also be used for control of spot size by varying the intensity. The use of different spot sizes can effectively be employed as letters or numbers are created so as to avoid roughened edges and improve character formation. The system of this invention can also employ two power sources using parallel laser beams with each of the beams being of a different diameter and corresponding spot size. This will provide a matrix of dots having different sizes for forming a single generated character. The different size dot will intermesh to create letters and numerals having a smoother appearance.

Having thus described the invention, it will be seen that there is provided a laser scanning system which achieves the various objects of this invention and which would be well suited to meet conditions of practical use.

As various changes may be made in this system as above set forth, it is to be understood that all matter herein described or shown in the accompanying drawings is to be interpreted as illustrative and not in a limiting sense.

What is claimed is:

1. A method of producing on a photoreceptor an image of generated shapes made up of spots, comprising:
    directing a plurality of beams of light toward a photoreceptor, each beam of light generating a spot on the photoreceptor and controlling a parameter of the light beams to produce spots of different sizes whereby the appearance of smoothed edges are given to the generated shapes.

2. The method of claim 1 wherein the parameter controlled is light beam intensity.

3. Apparatus for producing on a photoreceptor an image of generated shapes made up of spots, comprising:
    means for directing a plurality of beams of light toward a photoreceptor to generating a plurality of spots on the photoreceptor and means for generating spots of different sizes whereby the appearance of smoothed edges are given to the generated shapes.

4. A method of character formation, comprising:
    producing a dot matrix representation of characters, and
    intermeshing different size dots to generate characters having smoothed edges.

5. Apparatus for character formation, comprising:
    means for creating a dot matrix representation of characters, and
    means for intermeshing dots of different sizes to generate characters having smoothed edges.

6. Method for forming characters, the steps comprising:
    producing dots on a medium,
    controlling the location of said dots on said record medium to produce characters,
    supplying information of the characters to be printed to said producing means, and
    controlling the dot sizes so as to produce characters with smooth edges.

7. Apparatus for forming characters, comprising:
    means for producing dots on a medium,
    means for controlling the location of said dots on said record medium to produce characters,
    means for supplying information of the characters to be printed to said producing means, and
    means for controlling the dot sizes so as to produce characters with smooth edges.

* * * * *

US004386272C1

(12) REEXAMINATION CERTIFICATE (4264th)
United States Patent
Check, Jr. et al.

(10) Number: US 4,386,272 C1
(45) Certificate Issued: Feb. 6, 2001

(54) APPARATUS AND METHOD FOR GENERATING IMAGES BY PRODUCING LIGHT SPOTS OF DIFFERENT SIZES

(75) Inventors: Frank T. Check, Jr., Orange; Ronald P. Sansone, Weston, both of CT (US)

(73) Assignee: Pitney Bowes, Inc., Stamford, CT (US)

Reexamination Request:
No. 90/005,418, Jul. 7, 1999

Reexamination Certificate for:
Patent No.: 4,386,272
Issued: May 31, 1983
Appl. No.: 06/391,029
Filed: Jun. 22, 1982

Related U.S. Application Data

(60) Continuation of application No. 06/240,532, filed on Mar. 4, 1981, now abandoned, which is a division of application No. 06/130,278, filed on Mar. 4, 1980, now Pat. No. 4,310,757, which is a division of application No. 05/922,596, filed on Jul. 7, 1978, now Pat. No. 4,218,157.

(51) Int. Cl.⁷ .......................................... H01J 3/14
(52) U.S. Cl. ..................... 250/236; 346/107.1; 358/298
(58) Field of Search ................................. 250/234–236, 250/201.1; 101/93.04; 346/107.1–107.6; 358/296, 298, 300, 302

(56) References Cited

U.S. PATENT DOCUMENTS

| | | | |
|---|---|---|---|
| 3,471,847 | * 10/1969 | McCollough et al. | 340/742 |
| 3,549,798 | 12/1970 | Young | 178/6.6 |
| 3,641,887 | 2/1972 | Moyroud | 95/4.5 |
| 3,643,251 | 2/1972 | Kolb et al. | 340/324 A |
| 3,646,262 | 2/1972 | Moe | 178/6.7 R |
| 3,651,258 | 3/1972 | Ammann | 178/15 |
| 3,703,138 | 11/1972 | Moyroud | 95/4.5 R |
| 3,725,574 | 4/1973 | Gast | 178/6.7 R |
| 3,750,189 | 7/1973 | Fleischer | 346/74 |
| 3,783,185 | 1/1974 | Spaulding | 178/5.2 |
| 3,812,491 | 5/1974 | Barraclough et al. | 340/324 AD |
| 3,867,571 | 2/1975 | Starkweather et al. | 178/7.6 |
| 3,898,627 | 8/1975 | Hooker et al. | 340/172.5 |
| 3,944,323 | 3/1976 | Starkweather | 350/7 |
| 3,983,319 | 9/1976 | Moe et al. | 178/6.7 R |
| 4,014,030 | 3/1977 | Stark et al. | 346/160 |
| 4,031,519 | 6/1977 | Findley | 364/900 |
| 4,034,400 | 7/1977 | Owen et al. | 358/75 |
| 4,040,737 | 8/1977 | Masaki et al. | 355/49 |
| 4,047,248 | 9/1977 | Lyman et al. | 364/900 |

(List continued on next page.)

FOREIGN PATENT DOCUMENTS 51-128225  5/1978  (JP) .................................. B41J/3/10

OTHER PUBLICATIONS

Thomas A. Miller, "Printers With a Soft Touch," *Machine Design*, Oct. 20, 1977, pp. 40–41.
J. R. Kinghorn, "Character Rounding for Alphanumeric Video Display," *Mullard Technical Communications*, No. 126, Apr. 1975, pp. 230–239.
William E. Koeblitz, "Technology of Asynchronous Ink Jet Printing," *Society of Photographic Scientists and Engineers*, 1974, pp. 179–181.
Koeblitz, W. E., Gould Laboratories, Cleveland, OH, "Technology of Asynchronous Ink Jet Printing", pp. 179–180.

*Primary Examiner*—Stephone B. Allen

(57) ABSTRACT

An electro-optical light scanning system using a modulated laser illumination source directed upon a multifaceted rotating polygonal mirror or polygon. The mirrored facets reflect the impinging light toward a moving photoreceptor and forms a raster of scan lines as the photoreceptor moves. The system incorporates sensing optics and closed loop electronics for correcting inaccuracies in the position of the reflected light resulting from defects in the angular relationship between the plane of the facets and that of the rotating axis of the polygon as well as those errors due to inherent angular misalignment between each of the facets of the rotating polygon. The invention also encompasses amplitude modulation for varying the intensity of the laser illumination in conjunction with the acousto-optical modulation for maintaining a constant level illumination and/or for varying the spot size.

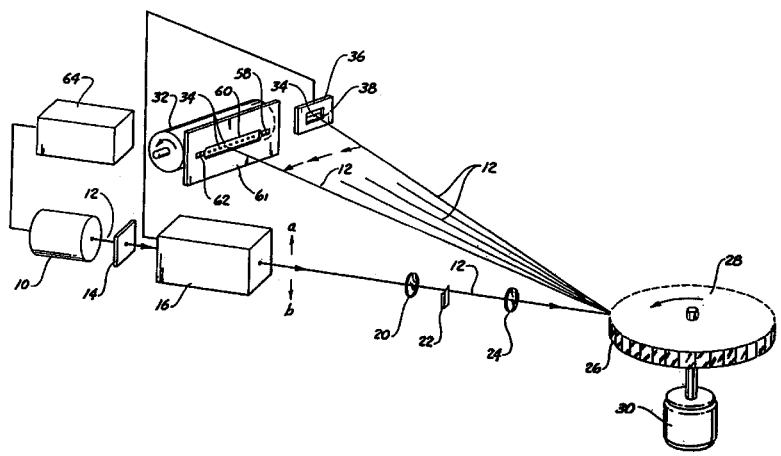

U.S. PATENT DOCUMENTS

| | | | |
|---|---|---|---|
| 4,050,077 | * 9/1977 | Yamada et al. | 346/75 |
| 4,051,536 | 9/1977 | Roetling | 358/298 |
| 4,052,715 | 10/1977 | Streifer | 346/160 |
| 4,052,719 | * 10/1977 | Hutt et al. | 178/30 X |
| 4,074,319 | 2/1978 | Goldschmidt et al. | 358/230 |
| 4,079,458 | 3/1978 | Rider et al. | 364/900 |
| 4,095,216 | 6/1978 | Spicer | 340/324 |
| 4,122,462 | 10/1978 | Hirayama et al. | 354/5 |
| 4,149,183 | 4/1979 | Pellar et al. | 358/75 |
| 4,149,194 | 4/1979 | Holladay | 358/283 |
| 4,163,229 | 7/1979 | Bodin et al. | 340/745 |
| 4,171,902 | 10/1979 | Imai et al. | 355/11 |
| 4,198,154 | 4/1980 | Masegi et al. | 355/5 |
| 4,212,009 | 7/1980 | Adleman et al. | 340/728 |
| 4,214,157 | * 7/1980 | Check et al. | 250/236 |
| 4,233,612 | 11/1980 | Hirayama et al. | 346/160 |
| 4,268,871 | 5/1981 | Kawamura | 358/298 |
| 4,281,333 | * 7/1981 | Tsuzuki et al. | 346/75 X |
| 4,310,757 | 1/1982 | Check, Jr. et al. | 250/236 |
| 4,386,272 | 5/1983 | Check, Jr. et al. | 250/236 |
| 4,809,021 | 2/1989 | Check et al. | 346/108 |
| 4,847,641 | 7/1989 | Tung | 346/154 |

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

\* \* \* \* \*